Jan. 16, 1940.  S. PALOS  2,187,400
ELECTROCUTING TRAP
Filed Nov. 14, 1938
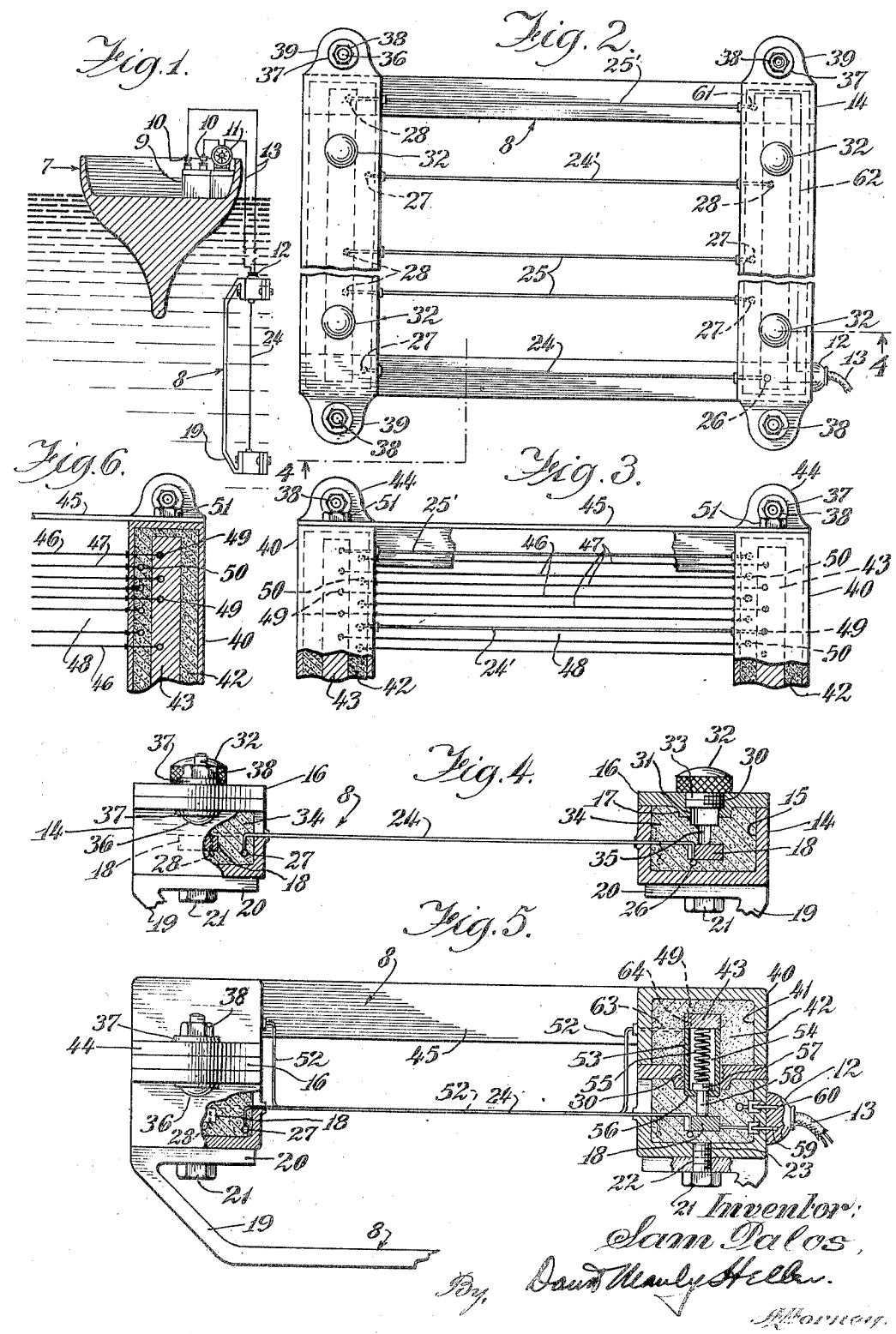
Inventor:
Sam Palos Patented Jan. 16, 1940

2,187,400

UNITED STATES PATENT OFFICE 2,187,400

ELECTROCUTING TRAP

Sam Palos, Argo, Ill.

Application November 14, 1938, Serial No. 240,275

4 Claims. (Cl. 43—112)

This invention relates to traps used to kill animals and insects instantly by electrocution.

One object of this invention is the provision of a grid structure with suitable electrode means, providing an open circuit to be closed by the animal to be electrocuted.

Another object of the invention is the provision of a secondary grid structure which is adapted to be secured to the primary grid structure, in order to vary the space between the respective electrodes and make the trap adaptable for electrocuting insects.

Another object of the invention is the provision of means whereby the secondary grid structure may be instantaneously attached to, or removed from, the primary grid structure.

Another object of this invention is the provision of a structure, which is fully insulated, and is adaptable for handling purposes and can be utilized for fishing.

Another object of the invention is the provision of a simple, practical, efficient structure, which is also economical to manufacture in quantity production.

Other features and objects of this invention will become apparent from the drawing and ensuing description, wherein like symbols are used to designate like parts and in which:

Fig. 1 represents a cross-sectional view of a water craft with my device submerged in the water, also showing the proper electrical connections to a source of electric current supply, and showing how my device is utilized as a fishing trap.

Fig. 2 is a top plan view broken medially, showing the construction of the primary grid structure.

Fig. 3 is a fragmentary top plan view of the secondary grid structure assembled to the primary grid structure.

Fig. 4 is a longitudinal cross-sectional view on the line 4—4 of Figure 2.

Fig. 5 is a longitudinal cross-sectional view of the primary and secondary grid structure in assembly, and partly shown in elevation.

Fig. 6 is a fragmentary cross-sectional view of the right hand receptacle of Figure 3 showing the method of connecting the electrode members of the secondary grid structure.

Referring to the drawing, Figure 1 shows a boat which may be utilized for fishing purposes, and which is equipped with a battery or other suitable means of electrical current supply, the boat being designated by the numeral 7, and the battery designated by the numeral 9, having terminals designated by the numeral 10, by virtue of which terminals it is connected in series with an ammeter structure designated by the numeral 11, and ultimately connected to the male electrical plug, with which my trap structure, generally designated by the numeral 8, is equipped.

The electrical wiring from the battery running either from the positive or the negative terminal is connected in series with the ammeter structure designated 11, and then the wire 13 terminates in a female receptacle type of plug designated by the numeral 12.

The reason for equipping the wire with a female type of receptacle is for the purpose of providing an arrangement which is electrically foolproof, and prevents anyone working with this device from accidentally being shocked by the electrical current.

Referring to the top plan view of Figure 2, I show generally the structural elements and their assembly with respect to my lower or main grid structure. It is comprised of two side portions designated by the numeral 14, and held together by virtue of the arched supports designated by the numeral 19.

The main body portions designated 14 are connected or tied together by the grid foot members designated by the numeral 19 which are formed substantially arched shaped, as illustrated, and are provided with the lug portions designated by the numeral 20. The lug portion 20 has a clearance hole 22 drilled therein for the purpose of permitting the attaching screw members designated by the numeral 21 to be threaded into the tapped hole designated by the numeral 23, thus tieing up the structures 14 with the leg structure designated 19.

It is to be noted that the grid supporting brackets 19 are of sufficient weight to effect the vertical self-alignment of the trap 8 when suspended in a body of water (Figure 1) to present the framed grid structure in the horizontal path of moving fish. Then, too, it may ofttimes be desirable to lower the trap until it rests on the bottom of a body of water in order to entrap particular types of fish whose known habits are such that they are most likely to be found in that lower region. With the trap 8 weighted by reason of the grid-supporting brackets 19, the operator is assured that the trap 8 will come to rest on the floor of the body of water with the brackets 19 resting on the bottom to present the framed grids 24—25—26 and 46—47—48 in upward horizontal position for contact with fish.

The structure 14 as can be noticed, has a trough or recessed portion designated by the numeral 15, and in this opening is placed the electrical bus bar member designated by the numeral 18. This bus bar member is provided for the purpose of connecting the electrodes 24 and 25. The bus bar on the right hand side interconnects the electrodes 24 and the bus bar on the left hand side is for the purpose of attaching it to the electrodes designated by the numeral 25.

The bus bar tends to connect a multiple number of electrodes 24 and 25 respectively as heretofore mentioned and it will be noticed that the electrodes 24 and 25 are wires which are conductors of electric current. The electrodes 24 and 25 are of the same length and are substantially straight having a slight bend to form a U-shaped form as indicated. The bent portions of the electrodes 24 are attached to one bus bar structure 18, and anchored to the insulated portion of the member 14 on the opposite side, in other words, insulated from the opposite bus bar in the structure 14 on the opposite side.

The wires or electrodes 24 are placed alternately in the grid structure, and are alternately connected to opposing bus bar structure. The bus bar on one side is connected to the positive terminal or anode designated 59, the other bus bar is connected to the terminal designated 60 or the negative or cathode terminal. The suitable wiring diagram in Figure 1, and the supplemental diagrammatic electrical arrangement shown in Figure 2, wherein it may be noted especially in Figure 2, that the negative electrode or the terminal 61 from the negative bus bar connection, is connected to the negative terminal 60 of the male plug 10, thru the lead wire 62. The terminals 59 and 60 are plugged into the female receptacle 12 shown at Figure 5.

It will be noticed that the end of the wires 24 and 25 are peened over into a ball shape as indicated at 26, 27 and 28 in order to retain the same firmly in place after attachment to the bus bars, which are suitably slotted as indicated.

The portion 14 and the cap member 16 are made of rubber, Bakelite or any other insulating material which furnishes practical construction, and permits handling the trap when setting it, or using it for the various operations heretofore described, without danger to the person or operator handling the trap.

After the electrodes 24 and 25 respectively are assembled as heretofore described, the cavities 15 are filled with plastic insulating material or composition designated by the numeral 34, and the entire arrangement is permitted to set in order that the insulation 34 may be permitted to solidify, and thus provide a complete insulated structure.

The cap 16 is provided with a boss portion designated by the numeral 17 and is drilled and tapped with a threaded hole 30 and with a reduced bore designated by the numeral 31, the purpose of which will be later described. There is also a further reduced bore or drilled hole designated by the numeral 35.

The knurled rubber or insulated screw plug designated by the numeral 32 has threaded portions designated by the numeral 33, and is used for the purpose of sealing the opening 30 in the cap 16 when the secondary grid is not being used and the trap is being utilized with the electrodes 24 and 25, spaced substantially apart for fishing purposes or for electrocuting animals, such as mice, rats, etc., and when the trap proper is utilized for such purposes in homes, garages, and other such places.

An important part of my invention is the secondary grid structure which is constructed similarly to the first grid structure, except that the electrodes as designated by 46 and 47 are substantially U shaped as indicated at 52 and have bent portions 63, a further bent portion 64 which terminates with a peened ball-shaped enlargement designated by the numerals 49 and 50, serving to attach it securely to the bus bar designated by the numeral 43.

The secondary grid is comprised of a case 40 having a recess 41 which is filled with plastic insulation 42 to seal the electrode terminals 26—27 and 49—50 from each other, maintain them in the desired uniform spaced relation, and shield such against access of water thereto during the immersion thereof; and made similar to the primary grid structure. The members 40 are held together by the strap 45 by virtue of screws 51. The novel structure of this secondary grid is such that it is provided with a number of closely spaced positive and negative electrodes respectively designated by the numerals 46 and 47, and alternately connected to the right hand bus bar whereas the negative electrodes are connected to the left hand bus bar.

It will be noticed that there are alternate, positive, and negative electrodes, and there is a gap 48 where two negative electrodes are spaced apart sufficiently to permit the positive electrode designated 24' to fit therebetween. The electrode 24' being one of the electrodes on the grid structure of the primary grid structure heretofore described.

The next gap 48 is made up with two positive electrodes of the secondary grid structure spaced to admit therebetween the next negative electrode 25' of the main grid structure, or primary grid structure heretofore described. These gaps 48 are alternately confined between two negative adjoining electrodes, and alternately confined between two positive electrodes of the secondary grid structure.

The purpose of this arrangement is so that when the secondary grid structure is placed and assembled with the primary grid structure, that the electrodes of the primary grid structure will fall in line with the electrodes of the secondary grid structure thereby providing an even and level grid structure comprised of closely spaced positive and negative electrodes.

The uniformly spaced relationship of closely spanning electrodes brought about as a result of assembling the secondary and primary grid structures permits the combined structure to be used for destroying or electrocuting small animals or insects.

The secondary grid structure as well as the primary grid structure is provided with ears or lugs, the primary grid structure having the lugs designated by the numeral 39 and the secondary grid structure having lugs designated by the numeral 44, and each of them being suitably drilled in order to receive the locking and binding screw designated by the numeral 36 assembled in place by virtue of the washers designated by the numeral 37 and the nut designated by the numeral 38.

The screw 36 is of sufficient length so that when the secondary grid structure is not utilized it may be used for clamping the cap 16 of the primary grid structure designated by the numeral 14.

When it is desired to connect the secondary grid structure, that is done rather instantaneously by locating the holes in the lugs 44, to register with the screws 36 and then clamping the nuts 38 in place making a uniform, solid, and rigid structure.

At the same time the binding post structure designated by the numeral 53 locates within the hole designated by the numeral 31 and offers a connection on the positive side between the bus bar 43 and the bus bar 18 and the respective bus bar 43 and bus bar 18 on the left side, thus maintaining the respective alternate, positive and negative electrode system needed, so that any two adjoining electrodes being shunted or closed by an insect will automatically close the electrical circuit and electrocute the insect.

When the trap is used for fishing purposes the ammeter structure is of great benefit, in that the trap being submerged and not being visible, an indication of current running thru the ammeter indicates that a fish has been electrocuted.

It is also interesting to note that my experiments have demonstrated that when using this trap, a fish under water being electrocuted, the water acts as a conductor and intensifies the electrocution, and when the trap is pulled up, the electrocuted fish will adhere to the respective electrode wires that it has contacted and thus the fish may be brought up; or after the fish is electrocuted if it should not adhere to the electrodes, it being a known fact that a dead fish will float, it will float up to the surface. Whenever it does not, the ammeter will indicate a current running thru the circuit whence the trap can be readily pulled up, and the trapped fish removed. Then the trap may be lowered once again to repeat the cycle of operation.

The special floating binding post structure connecting the bus bar 43 with the bus bar 18, will now be described, and as can be noted it comprises a tube designated by the numeral 53 which may be of metal or other suitable conductor material, and which is arranged to locate the secondary grid by virtue of its outside diameter having a working fit with respect to the hole designated by the numeral 31. This tends to gauge definitely the location of the secondary grid with respect to the primary grid structure.

The lower portion of the tube 53 which is connected to the bus bar 43 by soldering or other suitable operation, has its lower portion constricted to provide a shoulder designated by the numeral 56. The shoulder 56 retains the pin 58 which has a head designated by the numeral 57, and which pin 58 is kept in floating contact with the bus bar 18 by virtue of the spring designated by the numeral 55 housed in the bore 54.

The electrodes 46 connected to the bus bar 43 on the right hand side are connected to the bus bar 18 on the right hand side, by virtue of the floating binding post heretofore described having a floating contact terminal 58, and on the left hand side a similar structure is provided to connect the left hand bus bar 43 with its left hand bus bar 18, so that the resulting combined grid structure will provide alternate positive and negative electrode wires, subject to the circuit being closed by spanning at least one adjoining pair, or a series of adjoining pairs, of electrodes.

In operation, when it is desired to utilize my trap for fishing or for electrocuting animals, the primary grid structure is utilized and is connected thru the female receptacle 12 and the electrical connecting wire 13 to a suitable source of electric current supply such as a battery of a boat, or it may be attached to the battery terminals of an automobile parked on a shore line of a lake or other fishing place. When it is desired to utilize the trap as in the summer for electrocuting flies or other types of insects of that nature, the secondary grid is attached to the primary grid structure and the operation is self evident as heretofore elucidated.

The respective grid forming a series of alternate positively charged wires and alternate negatively charged wires, will tend to close the circuit once an adjoining pair of oppositely charged wires are contacted. The reason for providing the secondary grid structure can be readily understood, from the fact that insects are much smaller in size than animals or fish and require a closer spaced relationship betwen the electrodes in order that they may be effectively killed or electrocuted.

When the two grid structures are assembled and used for electrocuting insects, a higher voltage is necessary than that provided in building mains, hence a transformer may be connected in the circuit to step up the current to the required voltage.

In Figure 5 wherein a snap plug 12 is shown cooperating with the terminals 59 and 60, this structure being suggestive may be replaced with standard threaded electrical receptacle and plug members. The threaded form of receptacle would be more practical for fishing purposes.

I believe I have described in succinct terms the nature and advantages of my invention so that those skilled in and familiar with the art will have no difficulty in understanding my improvement.

Altho I have shown, illustrated, and described a preferred form it is to be understood that such form is merely typical or exemplary in so far as the adaptation of the structure or principles that I have herein expounded, and I reserve the right to any alterations, modifications, or improvements which may come within the scope of the invention herein revealed. It is to be limited only as defined by the appended claims, and by the prior art in the Patent Office at the time of the filing of this application.

Having thus described my invention what I claim as new and desire to secure by Letters Patent is:

1. An electrocuting trap comprising, a primary grid structure, and a secondary grid structure, the said primary grid structure having electrodes spaced substantially further apart than the spacing of the electrodes in the secondary grid structure, the secondary grid structure provided with gaps adapted to receive the electrodes of the primary grid structure, thus providing an assembled grid structure adapted to electrocute insects.

2. An electrocuting trap comprising, a primary grid structure provided with open recesses, and a secondary grid structure provided with spring actuated electric terminals adapted to fit the recesses in the said primary grid structure, the said spring actuated electric terminals adapted to locate and connect electrically the said primary and secondary grid structures simultaneously.

3. In a device of the character described, the combination with a plurality of primary electrodes comprising a grid, of a plurality of secondary electrodes comprising a grid alternately disposed in parallel spaced relation with said primary electrodes to present an assembled grid structure disposed in the same plane, each of said grids having terminals, means for maintaining said primary and secondary electrodes in parallel insulated sealed relation for immersion in water, and means interposed between the grids to complete an electrical connection between the confronting grid terminals.

4. In a device of the character described, the combination with a plurality of primary electrodes comprising a grid, of a plurality of secondary electrodes comprising a grid alternately disposed in parallel spaced relation with said primary electrodes to present an assembled grid structure disposed in the same plane, each of said grids having terminals the secondary grid of said assembled grid structure having spring actuated means seated therein for communication with the primary grid structure thereof to complete an electrical connection between confronting terminals of the assembled grid structure, and insulation means for maintaining said primary and secondary electrodes in parallel insulated sealed relation for immersion in water.

SAM PALOS.